United States Patent [19]
Harshberger, Jr.

[11] 4,129,810
[45] Dec. 12, 1978

[54] SWITCHING MOTOR CONTROL SYSTEM

[75] Inventor: Robert P. Harshberger, Jr., San Jose, Calif.

[73] Assignee: Ampex Corporation, Redwood City, Calif.

[21] Appl. No.: 682,372

[22] Filed: May 3, 1976

[51] Int. Cl.² ............................................. H02P 7/00
[52] U.S. Cl. ..................................... 318/317; 318/341; 318/442; 318/6
[58] Field of Search ..................... 318/317, 6, 341, 442

[56] References Cited

U.S. PATENT DOCUMENTS

| 3,260,912 | 7/1966 | Gregory | 318/599 X |
|---|---|---|---|
| 3,569,810 | 3/1971 | Thiele | 318/341 |
| 3,716,767 | 2/1973 | Kuriyama et al. | 318/341 X |
| 3,855,511 | 12/1974 | Smith | 318/341 X |
| 3,876,168 | 4/1975 | Powers | 318/6 |
| 3,913,134 | 10/1975 | Sargunar | 318/317 X |
| 3,947,738 | 3/1976 | Oliver | 318/341 |
| 3,965,405 | 6/1976 | Romano | 318/317 X |

Primary Examiner—B. Dobeck

[57] ABSTRACT

A switching motor control system that is particularly well suited for the reel motor of a tape transport system includes an energization command system commanding motor energization in response to tape buffer loop length, a feedback system indicating buffer loop length and actual motor current and a feedforward system energizing the motor to reduce the difference between commanded motor energization and actual energization as indicated by motor current. An integrator which sums the command and feedback signals with an AC reference signal outputs a triangle wave signal that is readily converted to a digital command signal by a simple transistor detector. An economical digital control circuit delays and selectively inhibits the digital command signal to control a motor drive amplifier in a switching mode which avoids power dissipation in the motor drive amplifier.

20 Claims, 4 Drawing Figures

SWITCHING MOTOR CONTROL SYSTEM

CROSS REFERENCE TO RELATED APPLICATIONS

This application is related to the following commonly assigned patent applications:

Web Transport Capstan Control System, Ser. No. 682,849, filed May 3, 1976 by Robert Perrine Harshberger, Jr.

Web Transport System, Ser. No. 682,373, filed May 3, 1976 by Roger R. Sleger.

BACKGROUND OF THE INVENTION

1. Field of the Invention

This invention relates to DC motor control systems and more particularly to control systems for web transport reel motors of the switching type.

2. Description of the Prior Art

DC motors operating in applications such as magnetic tape reel motors where moderate to large amounts of power are consumed are sometimes driven by a switching amplifier. The switching amplifier rapidly switches the motor drive to a low impedance voltage source.

A DC motor has a certain magnitude of motion response for a given low frequency drive signal applied thereto. For example, a drive signal varying slowly between plus and minus 10 volts might cause a given motor to vary in speed between plus and minus 500 R.P.M. If the frequency of the drive signal is increased while other factors remain constant a point will be reached where the peak motor speed will start to decrease below 500 R.P.M. The frequency of the input signal at which the maximum speed is down 3 decibels from the low frequency maximum speed is known as the cutoff frequency of the motor speed response. This cutoff frequency will typically be less than 100 Hz for a free running motor and will decrease as an inertial load is applied to the motor.

If the switching amplifier applies switching signals to the motor at a rate much faster than the motor cutoff frequency, for example, at least 10 times as fast, the motor response to a single short duration switching pulse will be negligible. However, the motor can be smoothly controlled by varying the average value of the switched signals by controlling their respective time durations. For example, an average 10 volt drive signal could be generated from a 20 volt power supply by switching the motor between 20 volt energization and no energization in a 50% duty cycle with a frequency at least 10 times the motor cutoff frequency. Since the drive circuit is either full on or full off it need dissipate no power.

To accomplish the same 10 volt drive from a 20 volt power supply, a linear drive circuit would have to dissipate power equal to 10 volts times the motor current. Multiple large, expensive power transistors as well as cooling fans might be required to dissipate this power.

The switching type of motor drive amplifier thus has a significant advantage from the standpoint of power dissipation. However, such circuits have disadvantages as well. For example, the motor energization command signals are typically continuously varying analog voltage or current signals that must be converted to switching signals having duty cycles proportional to the magnitudes of the analog voltages. Complex and expensive circuitry is required for this transformation of signal form. In addition, a motor drive power amplifier does not turn off instantaneously when commanded to do so. Because the transistors of a switching amplifier operate in a saturated condition, significant delays may occur between termination of an energization command and actual termination of motor drive current. If one polarity of switch turns on before the other turns completely off a short circuit will develop between the positive and negative power supply voltages and the resulting high currents can damage the switching transistors. A switching drive amplifier may thus require additional circuitry to prevent short circuits and expensive repairs when such circuitry fails.

In addition, the power supply provides low impedance voltage sources. As a result motor current can become quite high. Such currents can make stable control of a motor more difficult and can damage the power transistors if they become great enough.

SUMMARY OF THE INVENTION

A switching DC motor control system which is particularly advantageous for use as a web transport reel motor system includes a DC motor with constant field energization, an energization command system commanding a parameter of motor energization with an analog energization command signal, a feedback system generating an actual energization signal indicative of an actual status of an actual parameter of motor energization, and a feedforward system coupled to receive the energization command signal and the actual energization signal and drive the motor in a switching mode at a constant frequency independent of motor velocity to tend to reduce the difference between them.

In addition to providing an outer loop signal such as a web loop length signal, the feedback system provides an inner loop motor current signal to the feedforward system. This signal in effect provides impedance control and permits the motor to appear to be driven by a high impedance source even though it in fact is driven by switching coupling to a low impedance power supply voltage source.

The feedforward system converts readily generated continuously varying analog energization command and actual energization feedback signals to an AC triangle wave signal using a simple high open loop voltage gain operational amplifier. The inverting input of the operational amplifier is connected as a summing junction and a capacitor connected between the output and input causes integration of the sum of the input signals. Application of a squarewave to the summing junction creates a triangle wave output which is easily converted to a bistable digital signal by a transistor detector. This bistable signal has a variable proportion of time intervals in the two states to indicate magnitude and polarity of motor energization.

A digital control circuit positioned between the bistable digital signal and a motor drive amplifier readily permits simple digital control over system operations. For example, energization may be inhibited in response to one or more digital control signals and a short time delay may readily be imposed on the switch on command for each polarity of motor drive energization without such a delay for a switch off command. This arrangement permits the switching motor drive amplifier to be readily implemented to alternately switch between positive and negative power supply voltages without a power supply short circuit resulting from transistor turn off delays. Bipolar energization is thus readily achieved by selectively passing the bistable digital signal through the digital control circuit to command bipolar motor energization in accordance with the two states of the bipolar digital signal.

BRIEF DESCRIPTION OF THE DRAWINGS

A better understanding of the invention may be had from a consideration of the following detailed description, taken in conjunction with the accompanying, in which.

DETAILED DESCRIPTION

Figure 1:
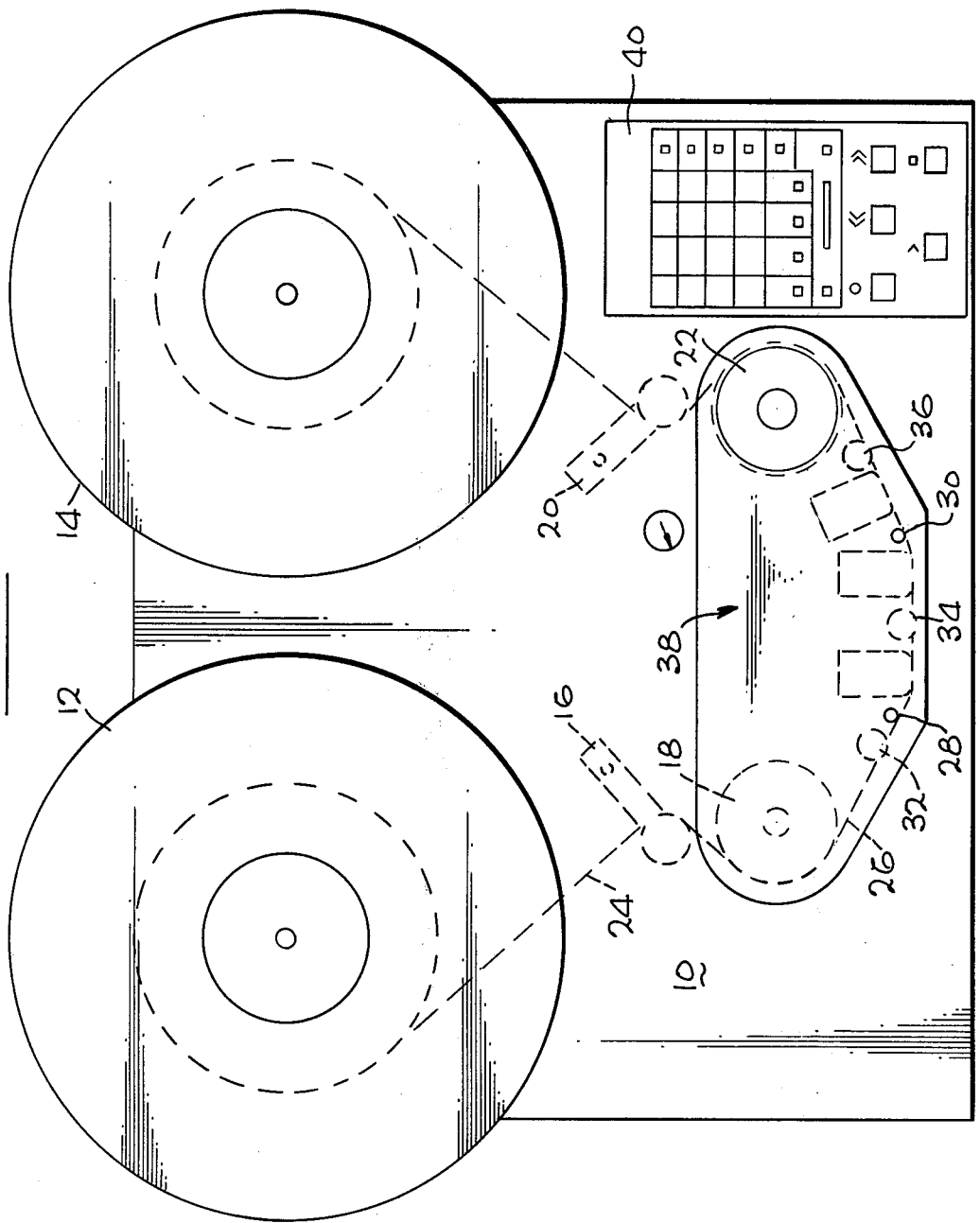
FIG. 1 is a plan view of a professional audio tape transport having a motor control system in accordance with the invention for reel motor control.

As shown in FIG. 1, a professional audio magnetic tape transport 10 includes a supply reel 12 driven by a supply reel motor and motor control system and a take-up reel 14 similarly driven by a take-up reel motor and motor control system. A supply tension arm 16 provides a tape buffer loop between the supply reel 12 and an idler roller 18 while a take-up tension arm 20 provides a tape buffer loop between the take-up reel 14 and a single drive capstan 22. A web member or tape 24 extends from the supply reel 12 past the tension arm 16 along a tape path 26 to the take-up tension arm 20 and take-up reel 14. Positioned along and defining the tape path 26 are the idler roller 18, a pair of lift pins 28, 30 for lifting the tape during high speed shuttle motion, a set of head guides 32, 34, 36, a set of transducer heads 38, and the single drive capstan 22. A control panel 40 provides the necessary controls for recording or reproducing and for tape motion. Further details of the transport 10 which are not essential to an understanding of the present invention may be found in the cross-referenced patent application.

Figure 2:
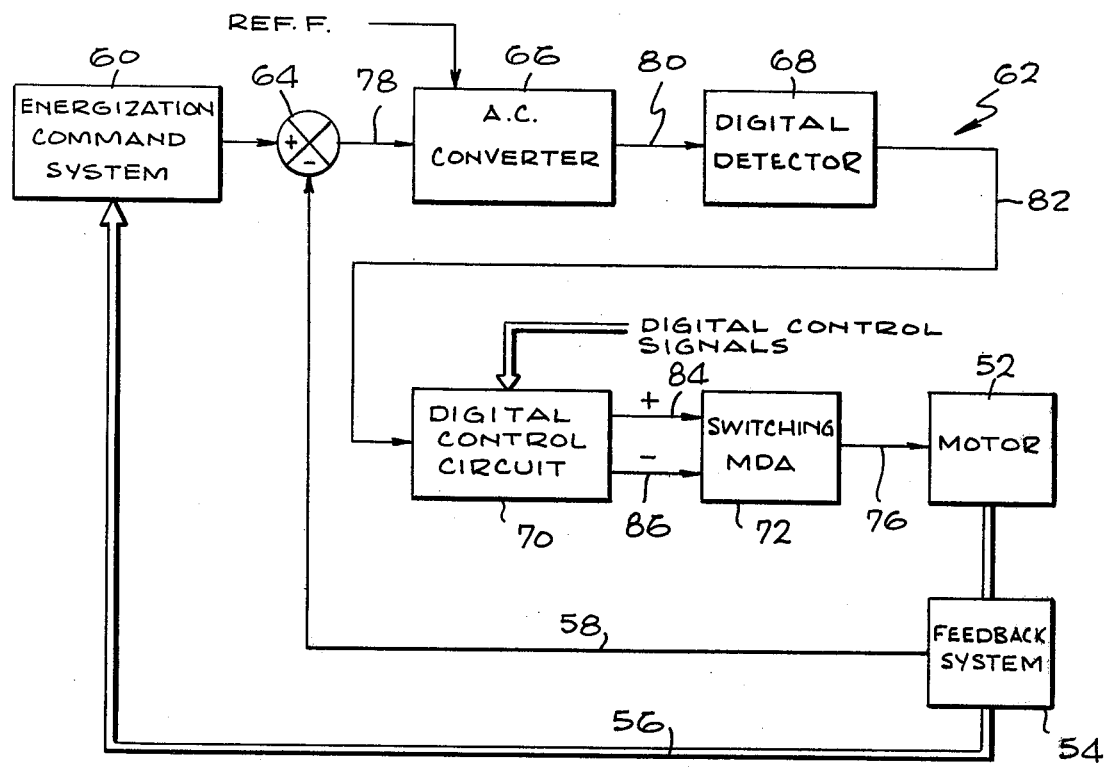
FIG. 2 is a block diagram representation of motor control system in accordance with the invention for controlling a take-up reel motor for the tape transport system shown in FIG. 1.

Making reference now to FIG. 2, there is shown a motor control system 50 for controlling the energization of a take-up motor 52 which is coupled to drive the take-up reel 14. While the motor control system for the supply reel which drives the supply reel 12 is not explicitly shown, it will be appreciated by those skilled in the art that except for slight differences in compensation to account for the asymmetrical positioning of capstan 22, it may be substantially identical to the motor control system 50.

A feedback system 54 provides one or more signals for controlling energization of motor 52. In the present example the feedback system includes a conventional sensor for detecting the position of tension arm 20 and generating a buffer loop actual position signal on conductor 56 which indicates buffer loop length. The buffer loop length is representative of the integral of the difference between the peripheral velocities of capstan 22 and the reel pack on reel 14. The buffer loop actual position signal 56 is thus indicative of the relative velocities of the reel motor 52 and the capstan 22. Feedback system 54 also senses the actual current through motor 52 and generates an actual energization signal on conductor 58 which is indicative of the actual current through motor 52. Although not implemented in the present example, the feedback system 54 might be configured to sense other parameters of energization for motor 52 to provide feedback systems for the control system 50. For example the feedback system 54 might also sense armature voltage or might include a digital or analog tachometer for sensing rotational velocity of rotational position of reel motor 52 and a tachometer might even be placed to be driven by the tape as it extends between reel 14 and tension arm 20 to indicate energization of reel motor 52 by indicating actual tape velocity adjacent to the reel 14. While the exact combination of feedback signals that is chosen will depend upon the operating requirements of a particular application, by applying the teachings of this invention, the feedback signals directly representing motor energization may be utilized in an inner feedback loop to provide better and more stable control over motor energization.

An energization command system 60 receives the buffer actual loop position signal on conductor 56, compares this signal to a reference signal and generates an energization command signal indicative of the difference therebetween. Because the circuit arrangement of the motor control system 50 readily converts from an analog command signal to a digital command signal, the energization command system may be a relatively simple arrangement for comparing the buffer loop actual position signal with reference signal. In fact, in the present example where the buffer loop actual position signal is a bipolar signal that increases in magnitude from zero as the tension arm 20 deviates from a central position, the energization command signal 60 can compare the buffer loop actual position signal to ground potential by merely passing it straight through as the energization command signal without change. In other arrangements wherein non-zero magnitude for the buffer loop actual position signal is commanded by a reference signal, energization command signal may include a simple summing amplifier receiving the reference signal and the buffer loop actual position signal as summing inputs.

A feed forward circuit 62, which includes a summing junction 64, an AC converter 66, a digital detector 68, a digital control circuit 70, and a switching motor drive amplifier 72, receives the energization command signal from the energization command system 60 as well as the actual energization signal from feedback system 54 and generates a motor drive signal on conductor 76 which energizes motor 52 so as to tend to reduce the difference between the two input signals. The energization command signal thus appears as a current command for motor 52 in motor control system 50. Unlike open loop switching motor drive amplifier systems, the feed forward circuit 62 thus appears to the motor as a high impedance motor energization source even though the motor 52 is energized only by the switching motor drive amplifier 72 selectively coupling it to low impedance positive and negative power supply sources. Open loop systems do not have the advantages of motor current control provided by the motor control system 50. The inner loop actual energization signal provided on conductor 58 is thus an important factor in providing better, more stable control over energization of motor 52 by indicating actual energization of the motor 52.

The AC converter 66 receives an analog energization error signal from summing junction 64 on conductor 78 as well as a squarewave reference frequency signal and generates an AC energization error signal on conductor 80. The AC energization error signal has a frequency determined by the reference frequency and an average magnitude and polarity representative of the analog energization error signal.

The digital detector 68 receives the AC energization error signal on conductor 80 and responds by providing a digital conversion to generate a digital energization error signal as an output on conductor 82. The digital energization error signal is a bistable digital signal which indicates the difference between commanded and actual energization by relative time durations of the different stable states or signal levels of the digital energization error signal. The digital energization error signal continues to switch with an average period corresponding to the reference frequency to facilitate control of the motor drive amplifier 72 in a switching mode.

A digital control circuit 70 receives the digital energization signal on conductor 82 as well as various digital control signals and generates bistable digital switching command signals on a pair of output conductors 84, 86. Because the signal received on conductor 82 is in bistable digital form, it may be readily modified or operated upon by digital logic within digital control circuit 70. For example, a simple inhibit gate may permit the signal to be selectively inhibited or passed to one of the output conductors 84, 86 in response to one or more digital control signals. In addition, a short delay is readily implemented for initiating energization of the motor drive signal on conductor 76 by switching amplifier 72 without delaying the termination of such energization. Short time delays may thus be provided between opposite polarity energizations by the amplifier 72 to prevent short circuiting of positive and negative power supply voltages and resultant damage to the components of amplifier 72.

The switching motor drive amplifier 72 may be a conventional switching drive amplifier circuit which couples conductor 76 to a positive power supply voltage in response to a given digital signal level on conductor 84 and couples conductor 76 to a negative power supply voltage in response to a given digital signal level on conductor 86. As is well known, after amplifier 72 is activated by an active signal level on one of the conductors 84, 86, because of transistor transit time delays, the amplifier 72 may continue to conduct current for a short time even after termination of the activation input signal. However, because of the time delay provided by digital control circuit 70, switching amplifier 72 may be alternately switched between positive and negative voltage power supplies without fear of a high short circuit current resulting from a turn-off delay.

Figure 3:
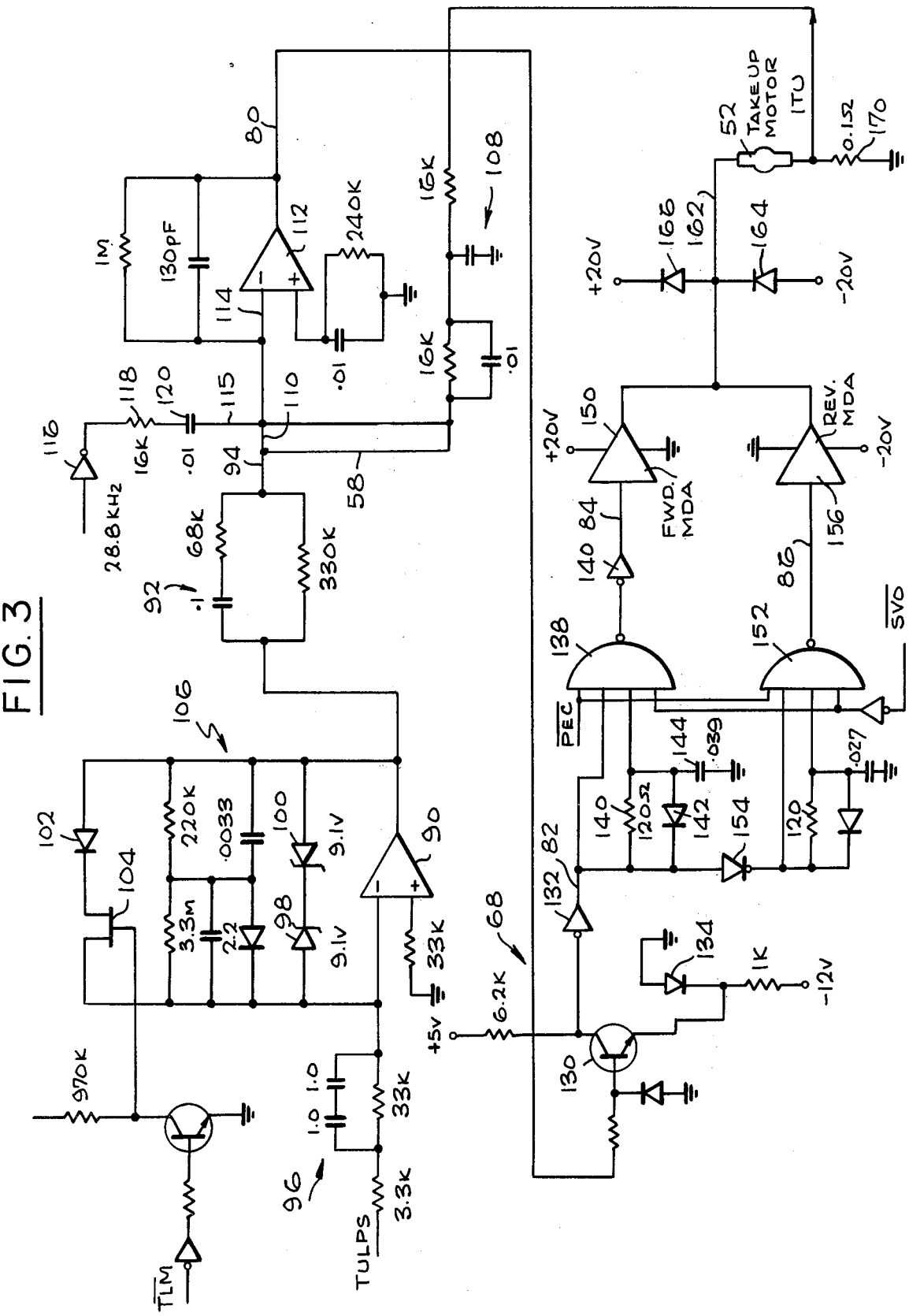
FIG. 3 is a schematic diagram representation of part of the motor control system shown in FIG. 2.

Referring now to FIG. 3, an operational amplifier 90 receives a take-up loop position signal, TULPS, compares the signal to a ground reference signal, and generates an output signal which is coupled through compensation circuitry 92 to provide an analog compensated tension arm position error signal on a conductor 94. As indicated previously, the take-up loop position signal is generated by sensing the position of tension arm 20. It has a zero magnitude at an intermediate tape loop length corresponding to a central arm position and increases in magnitude with a negative polarity as the tension arm 20 swings out and the buffer loop length decreases. As the tension arm 20 swings inward from the intermediate point and the buffer loop length increases, signal TULPS increases in magnitude with a positive polarity.

Signal TULPS is coupled to an inverting input of amplifier 90 through compensation circuitry 96. The inverting input is also coupled to the output of amplifier 90 by a pair of opposite polarity series coupled Zener diodes 98, 100 which clamp the output of amplifier 90 and constrain it to remain between approximately ± 9.7 volts. A diode 102 is coupled to conduct the output of amplifier 90 through a field effect transistor switch 104 to the inverting input. The gate electrode of switch 104 is coupled to the complement, $\overline{TLM}$, of a signal, TLM. Signal TLM is a tape load signal which operates to close transistor switch 104 during a tape load operation and inhibit generation of an energization command signal when the tension arms are swung to an outward extreme to facilitate tape threading. During normal operation the transistor switch 104 is in an open condition so that this circuit path has no effect upon operation of the motor control system 50. Additional feedback compensation 106 is provided between the output of amplifier 90 and its inverting input. While the compensation circuitry 92, 96 and 106 has not been described in detail, it is shown as actually implemented for the tape transport system 10 with capacitances shown in microfarads unless otherwise indicated and resistances shown in thousands of ohms as indicated. It will be appreciated by those skilled in the art that the compensation circuitry 92, 96 and 106 provides lead-lag compensation and that this compensation along with other compensations of the motor control system 50 was derived in accordance with conventional servomechanism design principles. While important for proper operation of the take-up motor 52, the particular signal compensation employed throughout the motor control system 50 is not considered to be an inventive feature of this disclosure.

A take-up motor current signal, ITU, is coupled through a compensation circuit 108 to provide an actual energization signal on conductor 58 which is algebraically summed with the analog compensated tension arm position error signal on conductor 94 by simple direct connection of conductors 58 and 94 to produce the energization command signal on conductor 110. An operational amplifier 112 has an inverting input 114 connected as a summing junction to receive the analog energization command signal on conductor 110 as well as an AC squarewave reference signal on a conductor 115. The reference signal on conductor 115 is generated by coupling a 28.8 KHz squarewave digital reference signal through a buffer inverter gate 116, a 16 K resistor 118, and a 0.01 microfarad capacitor 120. Since the resistor 118 and capacitor 120 have a high pass filter cutoff frequency of approximately 1000 Hz, capacitor 120 serves only to provide an average DC value on conductor 115 that is midway between the two stable output states of buffer gate 116 to permit substantially equal but opposite polarity currents to flow through capacitor 120 and resistor 118 each time the output of gate 116 changes states in response to transitions in the 28.8 KHz reference signal.

A 130 picofarad capacitor and a 1 megohm resistor coupled in parallel between the output and inverting input of amplifier 112 operate as a summing integrator.

Figure 4:
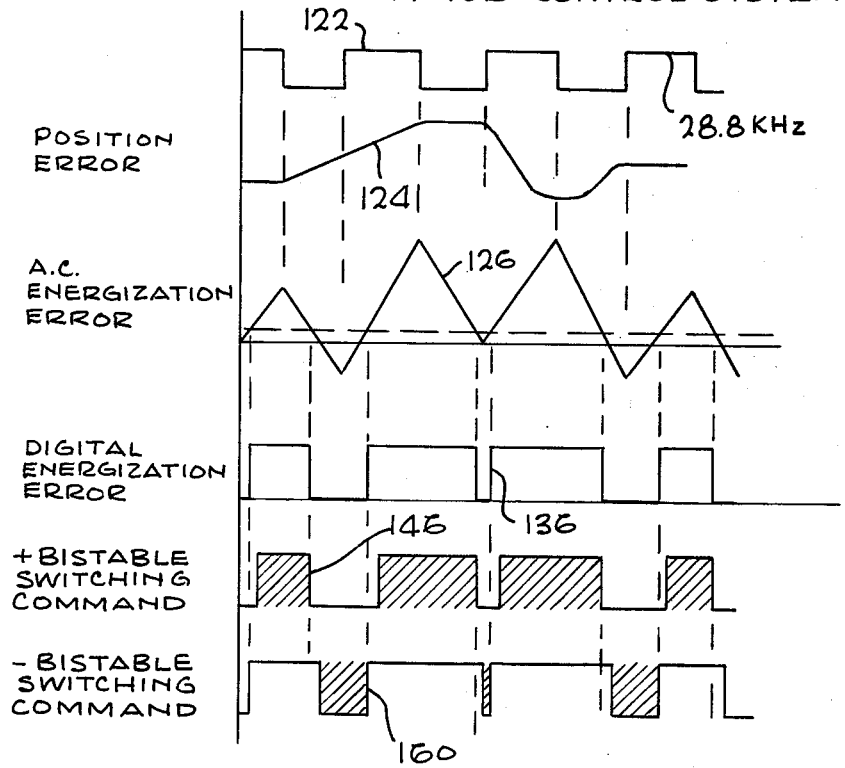
FIG. 4 is a waveform diagram illustrating several waveforms that are helpful in understanding the motor control system shown in FIGS. 2 and 3.

An AC energization error signal in the form of a triangle wave take-up position error signal appearing on output conductor 80 of the integrating operational amplifier 112 may be better understood with reference to FIG. 4. The 28.8 KHz reference signal is shown as waveform 122 while the position error signal is indicated as some arbitrary position error curve 124. The amplifier 112 automatically operates to sum these signals and integrate the sum to generate the AC energization error signal on output conductor 80 as indicated by curve 126 in FIG. 4. It should be readily apparent that the AC energization error signal is an AC triangular wave signal having a frequency at the reference frequency of 28.8 KHz and an average value equal to the integral of the AC energization error signal.

Referring now to FIG. 3, the digital detector 68 comprising an NPN transistor 130 and an inverter gate 132 receive the AC energization error signal and generate the digital energization error signal at the output of gate 132 on conductor 82 in response thereto. A diode 134 operates to maintain the emitter of transistor 130 at −0.6 volt so that if the AC energization error signal is above ground potential, transistor 130 conducts, driving its collector and the input of inverter gate low and hence the output of inverter gate 132 high. Similarly, if the AC energization error is below ground potential, transistor 132 turns off, thereby driving the collector of transistor 130 and the input to gate 132 high and the output of gate 132 low. The digital energization error signal on conductor 82 thus becomes a bistable digital signal which is in a true or high state when the AC energization error signal is positive and in a false or low state when the AC energization error signal is negative. Because the zero crossing times of the AC energization error signal are indicative of the analog energization error signal, the relative time durations of the true and false states of the digital energization signal are indicative of the analog energization error signal. At the same time, the digital energization error signal switches between states at approximately the reference frequency of 28.8 KHz. The AC converter 66 and digital detector 68 thus provide an extremely economical and convenient technique for converting the analog energization error signal to a digital energization error signal. It will be appreciated that the primary components required for this transformation are merely an inexpensive operational amplifier 112, a simple transistor 130, and an inverter gate 132.

Referring to FIG. 4, the digital energization error signal is represented by a curve 136 which can be readily seen to have a high state when the AC energization error signal represented by curve 126 is positive and a low state when curve 126 is negative.

Again making reference to FIG. 3, a NAND gate 138 receives the digital energization error signal as one input and, the complement of a play edit command, $\overline{PEC}$, as a second input, a servo on signal, SVO, as a third input, and a delayed digital energization error signal as a fourth input. The output of NAND gate 138 is coupled to the input of an inverter gate 140 which generates an output on conductor 84 which is a digital signal generated as though NAND gate 138 were an AND gate. Therefore, the bistable digital switching command signal on conductor 84 is high only when all four inputs are high. The digital energization error signal is thus easily inhibited or enabled by selectively changing the logic levels of digital input control signals. Signal SVO is low to disable gate 138 when tape is being threaded or at such other times as it is desired to inhibit reel motor operation. Similarly, $\overline{PEC}$ disables energization of take-up reel motor 52 during a play edit mode of operation during which time signal $\overline{PEC}$ is low. The play edit mode of operation is a special mode in which the tape transport 10 moves tape as though it were in an ordinary play mode of operation. However, the tension arm 20 is driven inward toward capstan 22 to operate as a pinch roller and rotation of reel 14 is disabled. This causes tape 24 to accumulate between the capstan 22 and reel 14. The accumulated tape may be cut out or otherwise edited by an operator. During a play mode of operation the supply reel 12 is operated in a normal manner and hence the control system for the supply reel 12 is not connected to be selectively disabled by the play edit command signal.

The fourth input to NAND gate 138 is coupled through a low pass filter having a 120 ohm resistor 140, a diode 142 coupled in parallel with the resistor 140 and a 0.039 microfarad capacitor 144 coupled between the fourth input and ground. Upon switching of the output of inverter gate 132 to a high state, a short time delay is encountered as capacitor 144 charges to enable the fourth input of gate 138. Since the output of gate 138 is energized only when all four inputs are high, a short delay is encountered between a low to high transition of digital energizing error signal at conductor 82 and a low to high transition of the positive bistable switching command signal on conductor 84. This relationship is illustrated by curve 146 in FIG. 4. The times during which the positive bistable switching command signal energizes a switching forward motor drive amplifier 150 have been cross-hatched for ease of identification. As the digital energization error signal makes a high to low transition the input to gate 138 which is directly coupled thereto immediately goes low and the positive bistable switching command signal on conductor 84 also immediately goes low. Thus, there is a delay in the switching signal for low to high transitions but no delay for high to low transitions. The diode 142 rapidly discharges capacitor 144 upon a high to low transition to rapidly initialize the low pass filter delay circuit to insure that the low to high transition time delay occurs even after a very short low state signal time for the digital energization error signal on conductor 82. A NAND gate 152 is connected in a manner similar to gate 138 except that the digital energization error signal is coupled through an inverter gate 154 to the inputs of NAND gate 152 and the output of NAND gate 152 is connected directly to a reverse switching motor drive amplifier 156. NAND gate 152 also receives the servo on enable signal, SVO, and the play edit command complement, $\overline{PEC}$.

Thus, the output of gate 152 goes low when the digital energization error signal on conductor 82 goes low except that the output of gate 152 has a short time delay for high to low commands and no time delay for low to high commands. This signal relationship is indicated by the negative bistable switching command curve 160 shown in FIG. 4.

The switching forward and reverse motor drive amplifiers 150, 156 are essentially bipolar transistor power switches. Amplifier 150 couples a conductor 162 which is connected to an armature terminal of take-up motor 52 to a +20 volt power supply voltage in response to a true level logic input. Similarly, reverse motor drive amplifier 156 couples conductor 162 to a −20 volt power supply voltage in response to a logic false or low lvel signal on input conductor 86. Thus, as the digital energization error signal switches between true and false logic states, the armature of motor 52 is switched to +20 volt and −20 volt power supply voltages with a sufficient time between their respective turn on states to allow for turn off delays in the opposite polarity amplifier without significantly affecting motor energization. The diodes 164 and 166 provide a conduction path for electrical energy stored by the inductance of motor 52 when both motor drive amplifier 150 and 156 are in an off or essentially open circuit output state.

The terminal of take-up motor 52 opposite conductor 162 is coupled through a 0.1 ohm current sensing resistor 170 to ground. The common terminal of resistor 170 and motor 52 provides a take-up motor current signal, ITU, as the actual energization feedback signal to permit control over motor current. The motor control system 50 thus appears as a high impedance current source even though the current is generated only by selectively coupling the motor 52 to low impedance voltage sources in a switching mode.

While there has been shown and described above a particular arrangement of a web transport system with a switching reel motor control system in accordance with the invention for the purpose of enabling a person of ordinary skill in the art to make and use the invention, it will be appreciated that the invention is not limited thereto. Accordingly, any modifications, variations or equivalent arrangements within the scope of the attached claims should be considered to be within the scope of the invention.

What is claimed is:

1. A motor control system comprising:
   a motor coupled to operate in response to a motor drive signal applied to the motor;
   an energization command system generating an energization command signal commanding a magnitude of motor drive current;
   a feedback system generating an actual energization signal indicative of actual motor drive current; and
   a feedforward system coupled to receive the energization command signal and the actual energization signal and to energize the motor in accordance with a difference therebetween to tend to reduce the difference, the feedforward system including a switching motor drive amplifier coupled to drive the motor with a motor drive signal that switches at a constant frequency between at least two different states at a switching rate that is independent of motor velocity and faster than the cutoff frequency response to the motor to the applied motor drive signal.

2. The motor control system according to claim 1 above, wherein the motor is a DC motor.

3. A motor control system comprising:
   a motor coupled to operate in response to a motor drive signal applied to the motor;
   an energization command system generating an energization command signal in response to an actual status signal, the energization command signal commanding a magnitude of motor drive current;
   a feedback system generating an actual energization signal indicative of actual motor drive current and generating the actual status signal indicative of the actual status of a parameter of the motor control system other than motor drive current; and
   a feedforward system coupled to receive the energization command signal and the actual energization signal and to energize the motor in accordance with a difference therebetween to tend to reduce the difference, the feedforward system including a switching motor drive amplifier coupled to drive the motor with a motor drive signal that switches between at least two different states at a switching rate that is faster than the cutoff frequency response of the motor to the applied motor drive signal.

4. The motor control system according to claim 3 above, wherein the motor control system is part of a tape transport system maintaining a buffer loop of tape and the actual status signal is indicative of the length of the buffer loop.

5. The motor control system according to claim 1 above, wherein the energization command signal and actual energization signal are each continuously variable over a minimum range of magnitudes.

6. A motor control system comprising:
   a motor coupled to operate in response to a motor drive signal applied to the motor;
   an energization command system generating an energization command signal commanding a magnitude of motor drive current;
   a feedback system generating an actual energization signal indicative of actual motor drive current; and
   a feedforward system including an AC converter circuit coupled to receive the energization command signal, the actual energization signal and an AC reference signal controlling the switching rate of the motor drive signal and generate an AC energization error signal in response thereto to energize the motor in accordance with a difference between the energization command signal and the actual energization signal to tend to reduce the difference, the feedforward system including a switching motor drive amplifier coupled to drive the motor with a motor drive signal that switches between at least two different states at a switching rate controlled by the AC reference signal that is faster than the cutoff frequency response of the motor to the applied motor drive signal.

7. The motor control system according to claim 6 above, wherein the AC converter circuit includes an analog summing junction and an integrator and generates the AC energization error signal as an integral of the sum of a plurality of input signals including the energization command signal, the actual energization signal and the AC reference signal.

8. A motor control system comprising:
   a motor coupled to operate in response to a motor drive signal applied to the motor;
   an energization command system generating an energization command signal commanding a parameter of energization of the motor;
   a feedback system generating an actual energization signal indicative of an actual status of a commanded parameter of energization of the motor; and
   a feedforward system coupled to receive the energization command signal and the actual energization signal and to energize the motor in accordance with a difference therebetween to tend to reduce the difference, the feedforward system including a switching motor drive amplifier coupled to drive the motor with a motor drive signal that switches between at least two different states at a switching rate that is faster than the cutoff frequency response of the motor to the applied motor drive signal, an AC converter circuit having an analog summing junction and an integrator coupled to receive the energization command signal, the actual energization signal and an AC reference signal controlling the switching rate of the motor drive signal and generate an AC energization error signal in response thereto as an integral of the sum of a plurality of input signals including the energization command signal, the actual energization signal and the AC reference signal, and a digital detector coupled to generate a two state digital energization error signal as an output in response to the AC energization error signal, the state of the digital energization error signal being dependent upon whether the magnitude of the AC energization error signal is greater than or less than a reference magnitude, the digital energization error signal being coupled to control the state of the motor drive signal 9. The motor control system according to claim 8 above, wherein the feedforward system further includes a digital control circuit coupled to receive the digital energization error signal and at least one digital control signal and control the energization of the motor drive amplifier in response thereto with a time interval shorter than one half period of the AC reference signal being provided between switching off the motor drive amplifier in one state and switching on the motor drive amplifier in an opposite state.

10. The motor control system according to claim 9 above, wherein the digital control circuit includes a digital logic gate coupled to inhibit energization of the motor drive amplifier in response to at least one digital control signal.

11. A motor control system comprising:
a constant field DC motor coupled to operate in response to a motor drive signal applied to an armature thereof;
an energization command system generating an energization command signal commanding a parameter of motor energization;
a feedback system coupled to sense the status of said parameter of motor energization and generate an actual energization signal indicative thereof; and
a feedforward system coupled to receive the energization command signal and the actual energization signal and generate a motor drive signal tending to energize the motor to reduce the difference therebetween, the motor drive signal appearing only as either a first voltage or a second voltage of a polarity opposite the first voltage with any open circuit condition having a duration insufficient to significantly affect motor energization.

12. The motor control system according to claim 11 above, wherein the feedforward system further includes a clamping circuit coupled to constrain the armature voltage to remain between approximately the first and second voltages.

13. A web transport reel motor control system comprising:
a DC motor coupled to drive a reel of web material in response to a motor drive signal applied thereto;
a feedback system coupled to sense a parameter of motor energization and generate an actual energization signal indicative thereof; and
a feedforward system coupled to receive the actual energization signal and an energization command signal and generate a motor drive signal tending to energize the motor to reduce any difference therebetween, the feedforward system including a non-dissipative type of motor drive amplifier operating in a switching mode to generate the motor drive signal as an output by coupling the output to first or second opposite polarity power supply voltages or deenergizing the output.

14. A web transport reel motor control system comprising:
a DC motor coupled to drive a reel of web material in response to a motor drive signal applied thereto;
a feedback system coupled to sense a parameter of motor energization and generate an actual energization signal indicative thereof and coupled to sense a length of a buffer loop of web member and generate a buffer loop actual position signal indicative thereof;
a feedforward system coupled to receive the actual energization signal and an energization command signal and generate a motor drive signal tending to energize the motor to reduce any difference therebetween, the feedforward system including a non-dissipative type of motor drive amplifier operating in a switching mode to generate the motor drive signal as an output by coupling the output to first or second opposite polarity power supply voltages or deenergizing the output; and
an energization command system coupled to receive the buffer loop actual position signal and generate the energization command signal in accordance with a difference between the buffer loop actual position signal and a buffer loop reference position signal.

15. A web transport reel motor control system comprising:
a DC motor coupled to drive a reel of web material in response to a motor drive signal applied thereto;
a feedback system coupled to sense motor current and generate an actual energization signal indicative thereof; and
a feedforward system coupled to receive the actual energization signal and an energization command signal and generate a motor drive signal tending to energize the motor to reduce any difference therebetween, the feedforward system including a non-dissipative type of motor drive amplifier operating in a switching mode to generate the motor drive signal as an output by coupling the output to first or second opposite polarity power supply voltages or deenergizing the output.

16. A motor control system for controlling the operation of a DC motor, the system comprising:
means coupled to the motor for sensing motor current and generating an actual motor current signal indicative thereof; and
means responsive to the actual motor current signal and a reference motor current signal for energizing the motor in response, to a single bistable digital energization error signal having a constant frequency and a pulse width which varies in accordance with the difference between the actual and reference motor currents, the energizing means including a switching motor drive amplifier continuously switching the motor between alternate first and second opposite polarity constant energization states in response to the digital energization error signal in a switching mode providing the effect of energizing the motor with a controlled current commanded by the reference motor current signal for all conditions of motor operation.

17. A motor control system comprising:

a DC motor; and a motor drive system coupled to energize the motor in response to at least one input signal, the motor drive system including means responsive to the at least one input signal for generating a motion command signal that varies continuously in magnitude over at least a given range, means responsive to the motion command signal for generating a bistable motion command signal indicating commanded motion by relative durations of first and second opposite states, a digital control circuit having only bistable digital logic, the digital control circuit receiving the bistable motion command signal and at least one digital control signal and operating to modify the bistable motion command signal in accordance with the at least one digital command signal to generate a tri-stable energization command signal commanding first or second opposite polarity energization or no energization and a switching motor drive circuit coupled to provide the motor with first or second constant energization or no energization as indicated by the tristable energization command.

18. The motor control system according to claim 17 above, wherein the digital control circuit includes digital means for selectively inhibiting and passing the bistable motion command signal and means for delaying initiation of a first or second constant energization tri-stable command without delaying termination thereof.

19. The motor control system according to claim 18 above, wherein the selectively inhibiting and passing means and the delaying means comprise a logic gate providing a given output state only when a plurality of inputs are each at given states, one input being directly connected to the bistable motion command signal, a second input being coupled through a low pass filter to the bistable motion command signal, and a third input being coupled to a digital control signal.

20. The motor control system according to claim 19 above, wherein the tri-stable energization command is provided as two separate energization control signals, each being generated as an output from a different logic gate, one having a bistable state commanding constant positive voltage motor energization and the other having a bistable state commanding constant negative voltage motor energization.

* * * * *